(12) United States Patent
de Joode

(10) Patent No.: US 11,698,278 B2
(45) Date of Patent: Jul. 11, 2023

(54) OPTIC DISTRIBUTED SENSING WITH IMPROVED DETECTION OF LEAKS IN A BLIND REGION

(71) Applicant: AP Sensing GmbH, Boblingen (DE)

(72) Inventor: Alex Souza de Joode, Roztoky u Prahy (CZ)

(73) Assignee: AP Sensing GmbH, Boblingen (DE)

( * ) Notice: Subject to any disclaimer, the term of this patent is extended or adjusted under 35 U.S.C. 154(b) by 0 days.

(21) Appl. No.: 17/644,549

(22) Filed: Dec. 15, 2021

(65) Prior Publication Data
US 2022/0196443 A1 Jun. 23, 2022

(30) Foreign Application Priority Data
Dec. 17, 2020 (EP) ..................................... 20214964

(51) Int. Cl.
*G01D 5/00* (2006.01)
*G01D 5/353* (2006.01)
*G01H 9/00* (2006.01)

(52) U.S. Cl.
CPC ......... *G01D 5/35361* (2013.01); *G01H 9/004* (2013.01)

(58) Field of Classification Search
None
See application file for complete search history.

(56) References Cited

U.S. PATENT DOCUMENTS

| 2012/0226452 | A1* | 9/2012 | Hill | G01H 9/004 |
| | | | | 702/56 |
| 2013/0333474 | A1* | 12/2013 | Godfrey | G01M 5/0025 |
| | | | | 73/592 |
| 2015/0135819 | A1* | 5/2015 | Petrella | E21B 47/135 |
| | | | | 73/152.58 |
| 2016/0349085 | A1* | 12/2016 | Yang | A61B 5/02055 |
| 2019/0197846 | A1* | 6/2019 | Englund | G08B 13/186 |

FOREIGN PATENT DOCUMENTS

| EP | 1 411 320 A2 | 4/2004 | |
| WO | WO 2011/058313 A2 | 5/2011 | |
| WO | WO-2011058313 A2 * | 5/2011 | ............. G01H 9/004 |
| WO | WO 2012/117223 A1 | 9/2012 | |
| WO | WO 2013/185225 A1 | 12/2013 | |
| WO | WO 2019/014721 A1 | 1/2019 | |
| WO | WO-2019014721 A1 * | 1/2019 | ............. G01H 9/004 |

\* cited by examiner

*Primary Examiner* — Brandi N Hopkins
*Assistant Examiner* — Nigel H Plumb
(74) *Attorney, Agent, or Firm* — Lewis Roca Rothgerber Christie LLP

(57) ABSTRACT

A method and arrangement of fibre optic distributed sensing for detection of an event at an event location within a blind region including using at least one optical fibre arranged at least partly along an object to be monitored and at least one light pattern interrogator coupled with the optical fibre; injecting light patterns at subsequent times; detecting backscatter light from the light patterns; and analyzing the backscatter light to determine the event location so that a detection range of the fiber optic distribution range of the fiber-optic distributed sensing system is extended into a blind region conventionally not accessible for detecting acoustic disturbances or acoustic events.

17 Claims, 3 Drawing Sheets

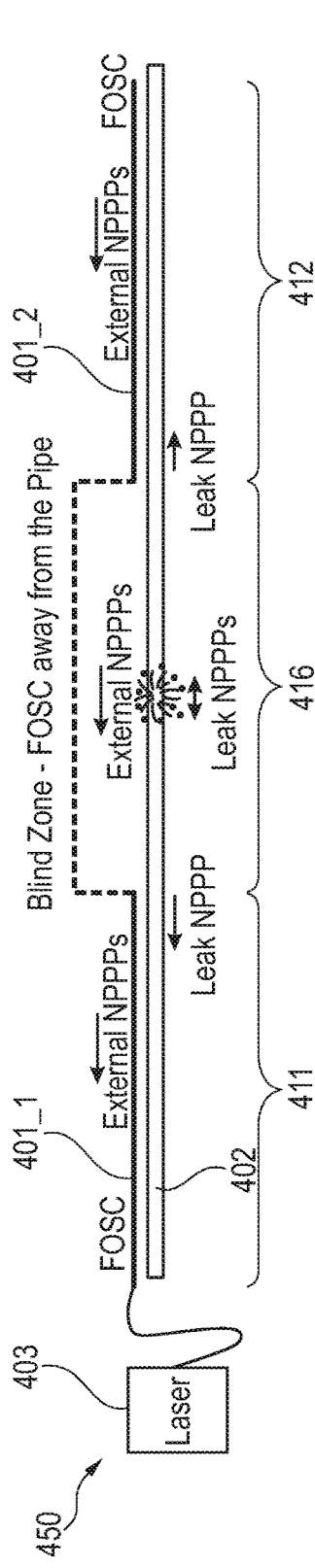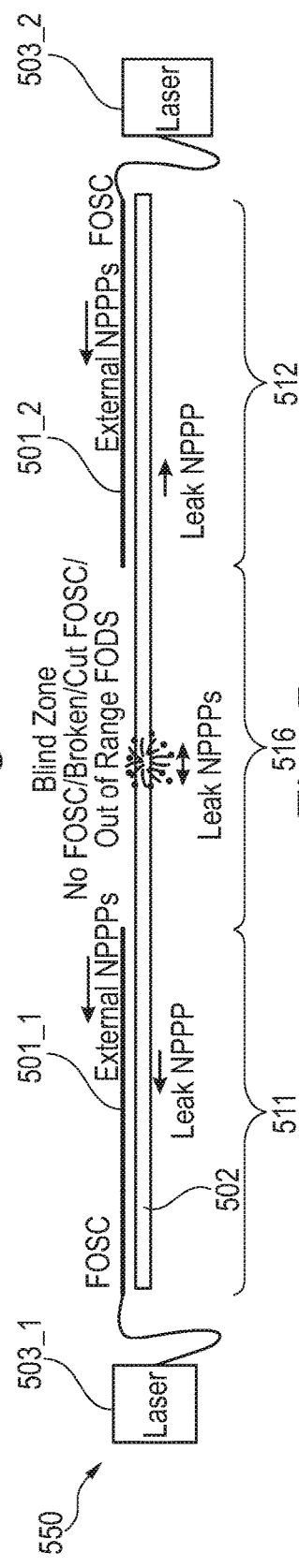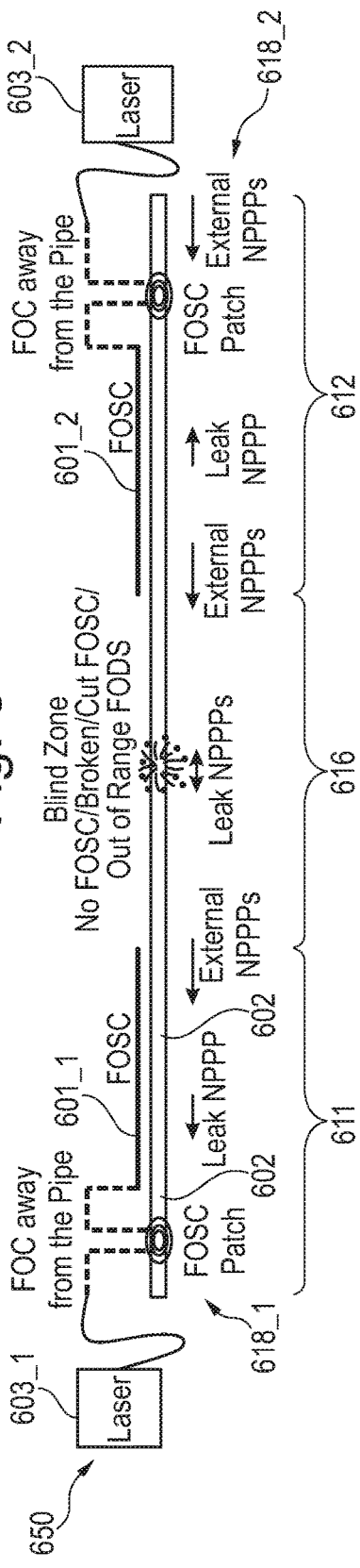

OPTIC DISTRIBUTED SENSING WITH IMPROVED DETECTION OF LEAKS IN A BLIND REGION

This application claims the benefit of the filing date of the European Patent Application No. 20 214 964.7 filed 17 Dec. 2020, the disclosure of which is hereby incorporated herein by reference.

FIELD OF INVENTION

The present invention relates to a method and to an arrangement of fibre optic distributed sensing for detection of an event at an event location within a blind region. Thereby, distributed temperature sensing and/or distributed acoustic sensing and/or distributed vibration sensing may be performed, in order to detect a disturbance or an event in a region, for example not directly providing usable signals for an optical fibre.

ART BACKGROUND

Fibre Optic Cables can be used in conjunction with techniques like DTS (Distributed Temperature Sensing), DAS (Distributed Acoustic Sensing) or DVS (Distributed Vibration Sensing) to sense the effects caused by the pipe leak/theft at the leak/theft event location. Techniques like DTS, DAS and DVS can be used together or on their own. These techniques use laser interrogators to transform the Fibre Optic Cable into FO Sensing Cables (FOSC) which are placed along the pipe length. The FOSC can be positioned inside of the pipe, externally near or attached to the pipe wall both underground or above ground.

With exception of Negative/Positive Pressure Pulses (NPPPs), the effects caused by pipe leaks/thefts are localised effects limited to the event immediate vicinity (localised temperature variations, localised orifice noise, localise vibrations and localised ground effects). Under the current state of the art, to ensure the pipe leak/theft event detection, the FOSC need to placed on to or very near (up to a few meters) the leak/theft event location even when NPPPs are used for leak detection. NPPPs can be traveling inside the pipe for reasons other than leaks/thefts and therefore it is necessary to monitor the location of the leak/theft.

Conventionally, when a leak is located to far away from the fibre, it cannot be detected. This limitation results in "blind regions or zones" without FODS pipe leak/theft detection where the FOSC monitoring is not possible like (but not limited to) in the following examples:

There is no FOSC at the pipe segment as FOSC was not installed along the entire pipe.

There is FOSC along the entire pipe, but the FODS leak/theft location is beyond the length range capability of the laser interrogator used in conjunction with the FOSC.

The FOSC has to separate out of sensing range temporally from the close vicinity of the pipe, like in crossings of rivers, lakes, fjords, offshore segments, motorways, bridges; rendering these critical locations unmonitored by the FODS at these limited locations.

The pipe segment(s) became un-monitored by the FODS due to the cut of the FOSC in single or multiple locations.

The high environmental noise around the pipe monitored by a close FOSC is such that leak/theft sensing is not possible at that location. This can occur because the leak effect is smaller than the background noise signals or the environment noise is of such magnitude that it can saturate the signal received by the FODS.

Thus, there may be a need for a method and a corresponding arrangement using the optic distributed sensing system which enables to extend a monitoring range at least partly to a region which is conventionally not accessible for monitoring.

SUMMARY OF THE INVENTION

The need is satisfied by the subject-matter of the independent claims. The dependent claims specify particular embodiments of the present invention.

According to an embodiment of the present invention it is provided a method of fibre optic distributed sensing for detection of an event at an event location within a blind region, the method comprising: using at least one optical fibre arranged at least partly along an object to be monitored and at least one light pattern interrogator coupled with the optical fibre; injecting light patterns at subsequent times; detecting backscatter light from the light patterns; and analysing the backscatter light to determine the event location.

Embodiments of the present invention may be applied to different variants of fibre optical distributed sensing techniques, e.g. to the variant of distributed temperature sensing (DTS), to distributed acoustic sensing (DAS), to distributed vibration sensing (DVS) which may all be applied for monitoring an object for example buried within the soil, such as a pipeline and/or an electric cable.

For example, distributed acoustic sensing (DAS) uses fibre optic cables to provide distributed strain sensing of objects adjacent to the optical fibre. Thereby, the optical fibre cable represents the sensing elements wherein optical pulses, in particular laser pulses, are injected into the fibre and backscatter signals, in particular Rayleigh backscatter signals are detected by a detector. In particular, a coherent laser pulse may be injected into the optical fibre and scattering sites within the fibre may act as a distributed interferometer with a gauge length approximately equal to the pulse length. Conventionally, the intensity of the reflected light is measured as a function of time after transmission of the laser pulse. This method is known as Coherent Rayleigh Optical Time Domain Reflectometry (COTDR). Typically, when the pulse has travelled through the full length of the fibre and all backscatter is received by the detector, the next laser pulse may be injected into the fibre. Changes in the reflected intensity of successive pulses from the same region of the fibre are caused by changes in the optical path length (for example represented by the index of refraction) of that section of the optical fibre. Using such a system, strain changes within the fibre and/or temperature variations of the optical fibre may be detected by detecting the reflected or scattered light pulses. The strain change may for example result from acoustic disturbances of an object to be monitored. When DAS is applied, Rayleigh backscattered or reflected light is detected which is due to variations in the refractive index of the optical fibre. In this case, elastic scattering occurs wherein the backscattered light has the same frequency and wavelength as the injected light.

For example, Brillouin scattering may be exploited which occurs due to the interaction between the injected light pulse with acoustic phonons travelling in the optical fibre. Thereby, the optical light pulses are scattered by moving phonons resulting in a frequency shift of the scattered light by the Doppler effect. Thereby, backscattered light at the frequency above and below the injected frequency is generated. These frequency shifts are called anti-Stokes shift or Stokes shift.

Embodiments of the present invention may apply distributed temperature sensing (DTS) which may rely on the Raman effect. Injected light pulses may excite molecular transitions of the molecules within the optical fibre. The scattered light comprises a wavelength which is shifted relative to the wavelength of the injected light. The shift is equivalent to the resonance frequency of the lattice oscillation. Reflected light may comprise Rayleigh scattering, a Stokes line and an anti-Stokes line. The optical light pulse is scattered in interaction with molecular vibrations in the optical fibre. Similar to Brillouin scattering, both the Stokes and the anti-Stokes components of the scattered light are generated which have a wavelength which is shifted relative to the wavelength of the injected light. By for example measuring a ratio of the intensity between the Stokes and the anti-Stokes scattered light components, an absolute value of the temperature may be measured by the distributed temperature sensing (DTS).

In other embodiments, Phase-Sensitive Coherent Optical Light Domain Reflectometry ($\phi$-OTDR) may employed. In standard optical time-domain reflectometry, the coherence lengths of the light sources used are shorter than the pulse lengths. On the contrary, in $\phi$-OTDR systems, the coherence length of the used light sources, such as lasers, is longer than the pulse length of the pulses injected into the optical fibre. An acoustic disturbance or an event near the fibre (for example at an object to be monitored) may generate an acoustic wave that effects the optical fibre by changing the phases of the backscattering centres.

Embodiments of the present invention allow to apply the method and the arrangement for monitoring for example of pipelines or cables, such as electric power cables.

In embodiments of the present invention, Optical Time Domain Reflectometry (OTDR) and/or Optical Frequency Domain Reflectometry (OFDR) may be applied. In OTDR, a light pulse is injected into the fibre and the backscattered light is analysed. From the time it takes the backscattered light to return to the detection unit it is possible to locate the event or to determine the event location. In OFDR, the backscatter signal is measured as a function of the frequency, for example may be subjected to Fourier-transformation.

The following definitions may apply in the context of the present application:

DTS—Distributed Temperature Sensing
DAS—Distributed Acoustic Sensing
DVS—Distributed Vibration Sensing
FOSC—Fibre Optic Sensing Cable
FODS—Fibre Optic Distributed Sensing
ASA—Advance Signal Analyses Pipe—The word Pipe is used to define a conduit made of any material, of any shape or diameter transporting fluid, gas, liquid, in single phase, dual phase or multiphase. Pipe also refers to a single pipe, network of interconnected pipes or parallel pipes in case the FOSC is used near multiple parallel pipes. Pipes are located in several types of locations and conditions like but not limited to: above ground, underground, buried, aerial, inside tunnels, inside casings, onshore, offshore, coated, subsea bundles, insulated, hot, cold, cryogenic. Pipes materials and constructions are varied, including but not limited to: metallic, non-metallic, composites, double walled, bundles, flexible, rigid, re-usable, welded, spigot/bell joint, flanged.

Leak/Theft—The term "pipe leak" in this context means an escape of fluid from inside the pipe to the environment, or fluid ingress from the exterior environment to inside the pipe. The term "pipe theft" means an escape of fluid from inside the monitored pipe caused by an unauthorized third-party into a third party pipe, container or to environment. Multiple Pipe thefts and more rarely pipe leaks can start or being occurring in multiple locations at the same time. Leaks normally don't stop after starting but pipe thefts can start/stop many times. Leaks/thefts are by nature static and localised sources of signals like acoustic/vibrations/temperature variations/NPPPs (Negative Pressure Pulses) that can be sensed by a FO Sensing Cable nearby.

NPPPs—Negative/Positive Pressure Pulses (NPPPs) in this context are pressure pulses traveling in the pipe wall and fluid caused by the onset of a pipe leak (as defined above) or every time a pipe theft start/stop. NPPPs can also be produced by the pressure instability caused the fluid exiting/entering the monitored pipe, by some pipe operation process (opening/close of valves) or even from processes/equipment's connected to the pipe but outside the monitoring pipe length like tanks, pumps/compressors, open/closing valves among others. The NPPPs created from a leak, will originate at the leak location and propagate in both directions away from the leak location as shown in FIG. 1 traveling (if allowed) many kilometres along the pipe length.

Embodiments of the present invention may extend the fibre optical distributed sensing capability for detection of events which are conventionally not accessible for fibre optical distributed sensing. The event location may represent the location at the object to be monitored at which the event occurred. The event location may conventionally not be surveyable using by fibre optical distributed sensing, since the optical fibre may be completely missing, may be arranged too far away from the object and/or environmental noise may be too high for enabling to receive usable signals from the backscatter light. The blind region may therefore represent a space area which has conventionally not been monitored or surveyable using the fibre optic distributed sensing techniques.

The object may be an extended object whose extent in a longitudinal direction is at least 100 times to 100000 times greater than the extent in a lateral direction. The object may for example comprise a pipeline and/or cable, in particular power cable, in particular buried in the soil.

The optical fibre may be arranged close to and/or within the object when outside the blind region.

The light pulse interrogator may comprise a light source, such as a laser source, a modulator adapted to form light patterns, for example comprising one or more pulses each, and configured to inject the light patterns or light pulses into the optical fibre. A light pattern may comprise for example one or two or even more light pulses according to embodiments of the present invention. Depending on the particular variant of fibre optic distributed sensing, a coherence length of the light source may be larger or smaller than the pulse length. A light detector may detect backscattered light pulses returning from the optical fibre in a time resolved manner. By considering the time of flight, the location from which the backscatter occurs within the fibre may be derivable. The (e.g. coherent) light may for example comprise visible light and/or infrared light and/or ultraviolet light. The backscatter light may for example comprise or be Rayleigh reflected light, i.e. elastically backscattered light having the same wavelength and frequency as the light injected into the optical fibre. The backscatter light may for example comprise inelastically backscattered light having a wavelength and frequency different from that of the light injected into the optical fibre.

The event location at the object is arranged within the blind region, in particular meaning that either no optical fibre is present in the vicinity of the event location close to the object and/or there is too high environmental noise such that detected backscattered light cannot be analysed in order to deduce the event and/or the optical fibre is too far away from the event location such that the event at the event location cannot be detected by sensing the disturbances at the optical fibre due to for example a pressure wave (generated due to the original event) propagating through the material between the object location and the fibre.

According to an embodiment of the present invention, the blind region may be a region so far away from any section of the optical fibre that any event within the blind region cannot be detected by the distributed sensing by the propagation of the disturbance (through material around the object) from the event location to any section of the optical fibre.

Embodiments of the present invention rather detect not the disturbance or pressure wave generated by the original event and propagating through the surrounding of the object between the event location and the optical fibre but rather detect (secondary) disturbances at locations of the optical fibre potentially far away from the event location which fibre disturbances occur due to a pressure wave originating from the original event location and propagating through the object and/or the environment towards those locations of the optical fibre, where the optical fibre is arranged close enough to the object such that (secondary) disturbances at the object (away from the event location) may be sensed by the adjacent fibre sections.

From the event location at the object, the pressure wave originates and propagates, primarily through the object (for example along the longitudinal axis of the object) and/or also partly through the material surrounding the object and being arranged between the object and the optical fibre. The pressure wave may propagate for example within the object to or along the object in two opposing directions. Thereby, the pressure wave may cause plural secondary (acoustic and/or temperature) events occurring along the object which occur at different locations along the object at different times. All these secondary events may be due to the (original) event having occurred at the event location.

Embodiments of the present invention may detect plural secondary events at locations of the object remote from the event location, since the secondary events at the object may be sensed at fibre optical portions which are arranged close to those secondary event locations.

The event related backscatter light may be due to disturbances at the optical fibre being close to the object in regions, where the secondary object events are localized. Identifying the event related backscatter light may thereby comprise to eliminate background signals which are not due to the original event. Identifying the event related backscatter light may improve the method, in particular improve the accuracy of the determined event location.

According to an embodiment of the present invention, the method further comprises tracking a wave front originating from the event location at different locations at different times by considering the event related backscatter light, in particular involving at least one of: extrapolating a curve of event related backscatter light into the blind region; regression analysis of a curve of event related backscatter light.

The event may cause the pressure wave as propagating along the object in opposite directions. The event may for example comprise a sudden intensive acoustic disturbance, such as an explosion or a loud noise starting at a particular event start time. The event may continue a particular time duration and may exhibit an increasing or decreasing or substantially constant acoustic amplitude for example. Thus, the event may for example comprise several event portions evolving over time, however, at a substantially same event location. One or more of the event portions may be tracked as event portion related backscatter light, for example. The wave front tracked or the wave front due to the propagating pressure wave may be tracked by detecting the respective (secondary) disturbances at fibre optical sections which are close to the object (at locations other than the event location, e.g. at the secondary event locations), thus in a sensing accessible region of the fibre. For example, the propagation of the pressure wave along the object may be detected by detecting respective optical fibre disturbances in sensing accessible regions, i.e. regions where the optical fibre is arranged close enough to the object and environmental noise is below a threshold for example.

As a sensing accessible region, a region around the optical fibre up to a particular distance, such as several metres or between 10 cm and several metres, may be defined. The blind region may be a region excluding the sensing accessible region.

Extrapolating or determining the curve may for example comprise a minimization procedure, such as a Gauss minimization procedure of the least squares by minimizing the sum of the squares of the residuals of the measured data and the model curve. Furthermore, through measured points in a coordinate system having as an abscissa the location and as an ordinate the time, a linear curve, i.e. a line may be constructed. The event location may then be approximately found by extending the line to a region in space and in time for which no measurement values are present and which corresponds to the event start time and the event location. Extrapolating and regression analysis may be conventionally known techniques, thereby enabling a simple implementation.

According to an embodiment of the present invention, identifying the event related backscatter light takes into account at least one of: a predefined speed of the propagating pressure wave, the predefined speed in particular essentially being the speed of sound for sound propagating within the object and/or the surrounding between the object and the fibre; a characteristic of the pressure wave evolution, in particular duration and/or intensity and/or profile shape; at least one intensity threshold.

The predefined speed of the propagating pressure wave may allow to appropriately filter out measurement signals which are not due to a propagating pressure wave within the object e.g. Furthermore, a particular characteristics of the pressure wave evolution may for example be known or derivable from any of expected event candidates. Thereby, a particular even type or class may be detectable by considering also the characteristic of the pressure wave evolution. For example, a breakage may result in a characteristic acoustic profile and thereby also in a characteristic pressure wave. A pipe leak may for example lead to a particular sound having a particular frequency or intensity. Further, the event may exhibit a particular acoustic intensity. Thereby, the event related backscatter light may be extracted from the entire measurement signals in a simple and reliable manner.

According to an embodiment of the present invention, the at least one or more optical fibres extend as a first fibre section from (e.g. a first end of) the blind region in a first direction and extend as a second fibre section from (e.g. a second end of) the blind region in a second direction, wherein detecting the backscatter light from the light patterns comprises: detecting first backscatter light of the light patterns backscattered (e.g. reflected) from the first fibre section; detecting second backscatter light of the light patterns backscattered (e.g. reflected) from the second fibre section, wherein analysing the backscatter light comprises: analysing the first backscatter light and the second backscatter light to determine the event location.

The first direction may for example be in a longitudinal direction of the object and the second direction may be in the opposite longitudinal direction of the object. Analysing the first backscatter light and the second backscatter light may enable to not only determine the event location but also the event starting time. From the event location, the pressure wave is expected to propagate in opposite directions, in particular along the first direction and the second direction. For example, a first pressure wave portion may propagate in the first direction and a second pressure wave portion may propagate in the second direction. The first pressure wave portion may give rise to first secondary events which are detectable as the first event related backscatter light. The second pressure wave portion may give rise to secondary events which may be detected as the second event related backscatter light. This will be detailed below.

For example, a first regression curve derived from the first event related backscatter light and a second regression curve derived from the second event related backscatter light may both be extended to points in time prior to their detection, in order to determine the event location as an intersection point intersection in particular at the event start time. Thereby, an extrapolation may be applied in a simple manner. In particular an extrapolation(s) may be performed to extend or extrapolate the measurement values from the sensing accessible region(s) into the blind region in which the event location is arranged.

According to an embodiment of the present invention, the method comprises at least one of tracking direction and/or timing of pressure wave related backscatter emanating from the first fibre section and the second fibre section; identifying mirror symmetry related first backscatter light and second backscatter light originating from disturbances at a first location (x1) and a second location (x2) at the same time having a mirror plane at the event location (xe); xe=x1+(x2−x1)/2, wherein xe is the event location.

The first fibre section and the second fibre section may be sections of one and the same fibre or may be sections of two or more fibres. When the pressure wave originating from the event location travels in the two opposite directions, it is assumed that the speed of sound has opposite direction but same value. Thus, the first event related backscatter light is assumed to be mirror-symmetrically arranged to the second event related backscatter light in a coordinate system of location and time. When the first pressure wave portion and the second pressure wave portion are observed at a same time by sensing the disturbances of respective fibre regions close to the positions reached by the respective pressure wave portions, the locations of the disturbed fibre areas should be by the same distance apart from the event location. Thus, applying the above formula to derive the event location xe should at least appropriately estimate the event location.

According to an embodiment of the present invention, analysing the first backscatter light and the second backscatter light comprises: identifying first backscatter light from fibre disturbances due to a first propagating pressure wave portion originating from the event as first event related backscatter light; identifying second backscatter light from fibre disturbances due to a second propagating pressure wave portion originating from the event as second event related backscatter light; analysing the first event related backscatter light and the second event related backscatter light to determine the event location.

The first propagating pressure wave portion originates from the event location due to the event and propagates through or along the object in the first direction. The second propagating pressure wave portion originates from the event location due to the event and propagates in the second direction (in particular opposite to the first direction) along or through the object and/or the surrounding. The first propagating pressure wave portion causes plural first secondary events at the object which in turn cause fibre disturbances when the plural first secondary events are within the sensing accessible region. Similarly, the second propagating pressure wave portion causes plural second secondary events at the object which can be detected when are arranged within the sensing accessible region. The first event related backscatter light as well as the second event related backscatter light is detected and analysed, in particular involving extrapolating those measurement points into the blind zone, in order to determine the event location.

According to an embodiment of the present invention, the method further comprises at least one of: filtering the detected backscatter light for attenuating other event related backscatter light related to another event causing another propagating pressure wave having a speed different from the predefined speed, in particular comprising Fourier-transformation; masking and Fourier-backtransformation; filtering the detected backscatter light for attenuating backscatter light that is due to a blind region outside event, in particular including detecting backscatter light from the first fibre section due to another pressure wave propagating towards the blind region and later detecting backscatter light from the second fibre section due to the other pressure wave propagating away from the blind region.

The filtering may for example involve the so-called f-k Fourier-transformation involving transforming the coordinates (x, t) into coordinates (k, f) representing the wave vector as a function of the frequency. In this k-f-space, an elimination of all kind of signals not propagating with an expected speed along the object can be eliminated or at least attenuated. A blind region outside event may be an event which occurs or occurred outside the blind region. Also such a blind region outside event may be registered or measured and may be eliminated by the filtering process. Such a blind region outside event may e.g. be identified by first identifying the backscatter from the first fibre section and later (in time) identifying for example backscatter from the second fibre section which has a same propagating speed, i.e. a speed in the same direction and with the same value. In contrast, any blind region event will cause secondary events propagating in opposite directions and being detectable and being detected in the first fibre section and the second fibre section, respectively.

According to an embodiment of the present invention, analysing the backscatter light to determine the event location takes into account at least one of: a length of the blind region; environmental noise. Thereby, the analysis may be simplified or improved.

According to an embodiment of the present invention, a single fibre is arranged along the object and one interrogator is coupled to the fibre; or wherein at least a first fibre is arranged extending from the blind region in a first direction wherein at least a second fibre is arranged extending from the blind region in a second direction, in particular substantially opposite to the first direction.

Thereby, different configurations may be supported. When only a single fibre is arranged along the object, within the blind region, the single fibre may be too far away from the object such that events within the object at or within the blind zone are not directly detectable by the single fibre but only indirectly via the aforementioned secondary events. When a first fibre and a (e.g. separate not connected to the first fibre) second fibre are provided, in the blind region, there may be no fibre present which is adjacent close enough to the object.

According to an embodiment of the present invention, the blind region is formed by at least one of: an intact fibre but too high background noise; the fibre being too far away from the object; the fibre being broken; no fibre being present. Thereby, different scenarios of forming a blind region are supported. In any case, in spite of how the blind region is formed, the event location may anyway be derivable by embodiments of the present invention.

According to an embodiment of the present invention, the object is or comprises at least one of: a pipe for liquid or gas, in particular hydrocarbon and or water, an electric cable, wherein the object is in particular buried in the soil of the earth's surface or at subsea and/or wherein the backscatter light is Rayleigh backscatter light, the method performing distributed acoustic sensing (DAS). Thereby, different kinds of objects to be monitored are supported.

According to an embodiment of the present invention, the event comprises an acoustic disturbance and/or a temperature change at the object at the event location, in particular caused by at least one of: at least one acoustic pattern; at least one pressure pattern; an object damage; an object impact; an object breakage; an object theft action; an object deterioration; a pipe leak; a cable short circuit, wherein the event causes a fibre acoustic disturbance and/or a fibre temperature change and/or a fibre strain change and/or a fibre refractive index change. Thereby, many different events may be supported for determining the event location. The event may in particular generate an intense or strong acoustic signal.

It should be understood, that any feature(s), individually or in any combination, disclosed, described, explained or provided for a method of fibre optic distributed sensing for detection of an event at an event location within a blind region, may also, individually or in any combination, apply to an arrangement for fibre optic distributed sensing according to embodiments of the present invention and vice versa.

According to an embodiment of the present invention it is provided an arrangement for fibre optic distributed sensing for detection of an event at an event location within a blind region, the arrangement comprising: at least one optical fibre arranged at least partly along an object to be monitored; at least one light pattern interrogator coupled with the optical fibre adapted to inject light patterns at subsequent times; a detector adapted to detect backscatter light from the light patterns; and a processor adapted to analyse the backscatter light to determine the event location.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWING

FIGS. 2 to 6 schematically illustrate different scenarios of a blind region, wherein embodiments of the present invention may be applicable.

DETAILED DESCRIPTION

Figure 1:
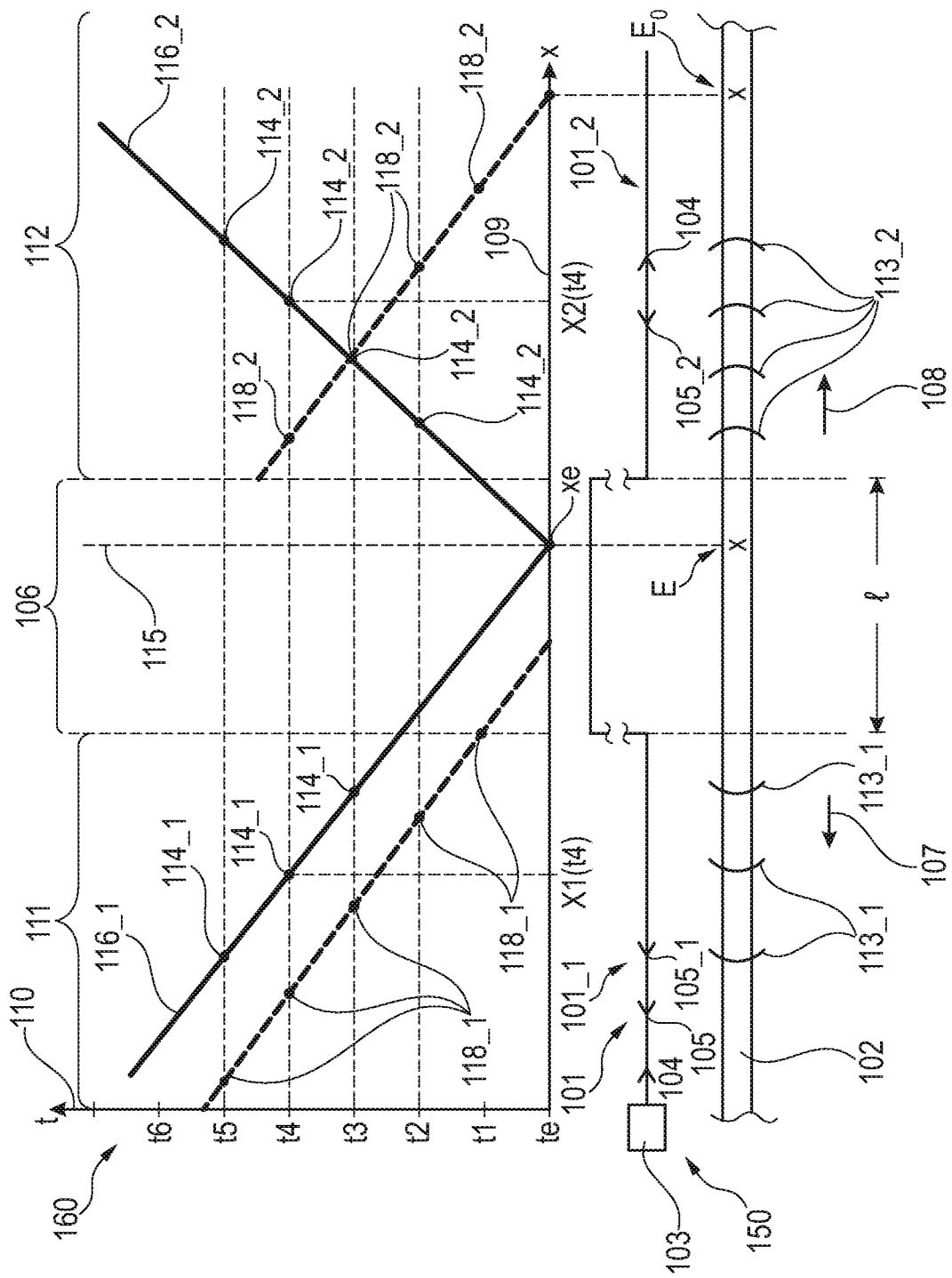
FIG. 1 schematically illustrates aspects of a method and arrangement of fibre optic distributed sensing for detection of an event according to an embodiment of the present invention.

FIG. 1 illustrates aspects of a method and arrangement 150 of fibre optic distributed sensing for detection of an event at an event location within a blind region according to an embodiment of the present invention. Therein, at least one optical fibre 101 is arranged at least partly along an object 102 (e.g. pipe) to be monitored. Furthermore, at least one light pulse interrogator 103 is coupled with the optical fibre 101. According to an embodiment, optical light patterns 104 are injected by the interrogator 101 at subsequent times. The light patterns 104 propagate along the optical fibre 101. The interrogator 103 may for example comprise a laser source for generating coherent light patterns, wherein each light pattern may for example comprise one or more light pulses. The interrogator 103 further comprises a detector which is configured for detecting backscatter light 105 from the light patterns injected 104.

The interrogator 103 and the fibre 101 are comprised in an arrangement 150 for fibre optic distributed sensing according to an embodiment of the present invention. The arrangement 150 further comprises a not in detail illustrated detector, which is adapted to detect the backscatter light 105 of the injected light patterns 104. The arrangement 150 further comprises a processor which is adapted to analyse the backscatter light 105 to determine an event location xe, which is arranged within a blind region 106.

In the blind region 106 illustrated in FIG. 1, the optical fibre 101 is too far away from the object 102 to be monitored. However, the optical fibre 101 is a single optical fibre comprising a first fibre section 101_1 and a second fibre section 101_2. The first fibre section 101_1 extends from the blind region 106 along a first direction 107 and the second fibre section 101_2 extends from the blind region 106 along a second direction 108 being opposite to the first direction 107. From the first fibre section 101_1, first backscatter light 105_1 is backscattered and detected by the detector comprised in the arrangement 150. From the second fibre section 101_2, second backscatter light 105_2 is backscattered and detected by the detector of the arrangement 150.

In the coordinate system 160 having an abscissa 109 indicating the location x and having an ordinate 110 indicating the time t, the first backscatter light is detected or registered in an area 111 (corresponding to a first sensing accessible region) of the coordinate system and the second backscatter light 105_2 is registered (or detected or depicted) in a second region 112 (corresponding to a second sensing accessible region) of the coordinate system.

Embodiments of the present invention enable to determine an event location xe of an event E happening to a point in time to at the object 102, although the event location xe is within the blind zone 106 which is an area which is conventionally not surveyable by optical sensing systems. Thereby, the method in particular analyses the first backscatter light 105_1 (as registered or detected in the area 111)

as well as the second backscatter light 105_2 detected or illustrated in the second area 112 of the coordinate system 160 illustrated in FIG. 1.

In particular, due to the event E occurring at the event location xe at the object 102, a first propagating pressure wave portion 113_1 originates from the event location xe at the object 102. The first propagating pressure wave 113_1 propagates along or through the object 102 in the first direction 107. Furthermore, a second propagating pressure wave 113_2 originates from the event location xe at the object 102 and propagates in the second direction 108. The first propagating pressure wave 113_1 leads to respective disturbances in the first fibre section 101_1 which disturbances are detected in the first backscatter light 105_1. Similarly, the second propagating pressure wave 113_2 causes respective fibre disturbances within the second fibre section 101_2 which are detectable by analysing the second backscatter light 105_2.

First event related backscatter light is represented by points 114_1 in the area 111 and represents measurement signals which are caused by the first propagating pressure wave 113_1. Second event related backscatter light is represented by measurement points 114_2 within the second region 112 and represent second backscatter light portions which are caused by the second propagating pressure wave 113_2 causing respective disturbances within the second fibre section 101_2. The respective first and second event related backscatter light 114_1, 114_2 is associated with (secondary event) times t1, t2, t3, t4, t5, as indicated on the ordinate 110 in the coordinate system illustrated in FIG. 1.

The method may involve to identify or define a mirror plane 115 which lies within the blind region 106 and which defines a mirror plane with respect to the first event related backscatter light 114_1 and the second event related backscatter light 114_2. The different measurement points 114_1 can be connected (or approximated) with a common (e.g. regression) line 116_1 having a particular inclination corresponding to the speed of sound within the object 102 of the first propagating pressure wave 113_1. Similarly, the measurement points of the second event related backscatter light 114_2 can be connected (or approximated) with a second common line 116_2 which has an inclination opposite to the inclination of the first line 116_1. This is due to the opposite propagation direction of the second propagating pressure wave 113_2 compared to the first propagating pressure wave 113_1.

According to an embodiment of the present invention, the event location xe is found to be the position where the mirror plane 115 is arranged. The event location xe can for example be determined as follows: xe=x1(ti)+(x2(ti)−x1(ti))/2, wherein xe is the event location and ti is any of times t1, t2, . . . .

In the illustration, the first event related backscatter light x1(t4) and the second event related backscatter light x2(t4) are taken at the same point in time, here for example t4. In other embodiments, other points in time may be utilized or a combination or an averaging may be applied.

In order to determine the exact equation of the first line 116_1 as well as the second line 116_2 regression techniques may be applied such as a Gauss algorithm to minimize the square of the errors. The inclination of the lines 116_1 and 116_2 may for example relate to a predefined speed of the respective propagating pressure waves 113_1, 113_2 and may be definable based on the material of the object 102. The first line 116_1 and the second line 116_2 (both defined by measurement points from a sensing accessible region 111, 112) intersect at the event location xe. Thereby, the intersection point may define the event location xe as well as event (start) time te.

In order to extract the event related backscatter light from noise and other disturbing signals, a filtering method may be applied. E.g., a blind region outside event Eo may for example be present which may potentially disturb the analysis. However, the signals caused by the blind region outside event Eo occurring outside the blind region 106 may be attenuated or even eliminated by observing whether for example first backscatter 118_2 from the second (first) fibre section (101_2) is detected and then, later, first (second) backscatter light 118_1 is detected, wherein the delay is equal to the time the pressure wave takes to traverse (within the object 102) the blind region 106. Thereby, an effective filtering may be applied. Therefore, according to embodiments of the present invention, the length or extent I of the blind region 106 is taken into account.

The FIGS. 2 to 6 schematically illustrate embodiments of an arrangement for fibre optic distributed sensing, which may be utilized in different applications.

It should be understood, that elements similar in structure and/or function are labelled with reference signs differing only in the first digit. A description of a particular element or structure not described in detail with respect to a particular embodiment may be taken from the description of the respective element or structure in another embodiment or figure.

Figure 2:
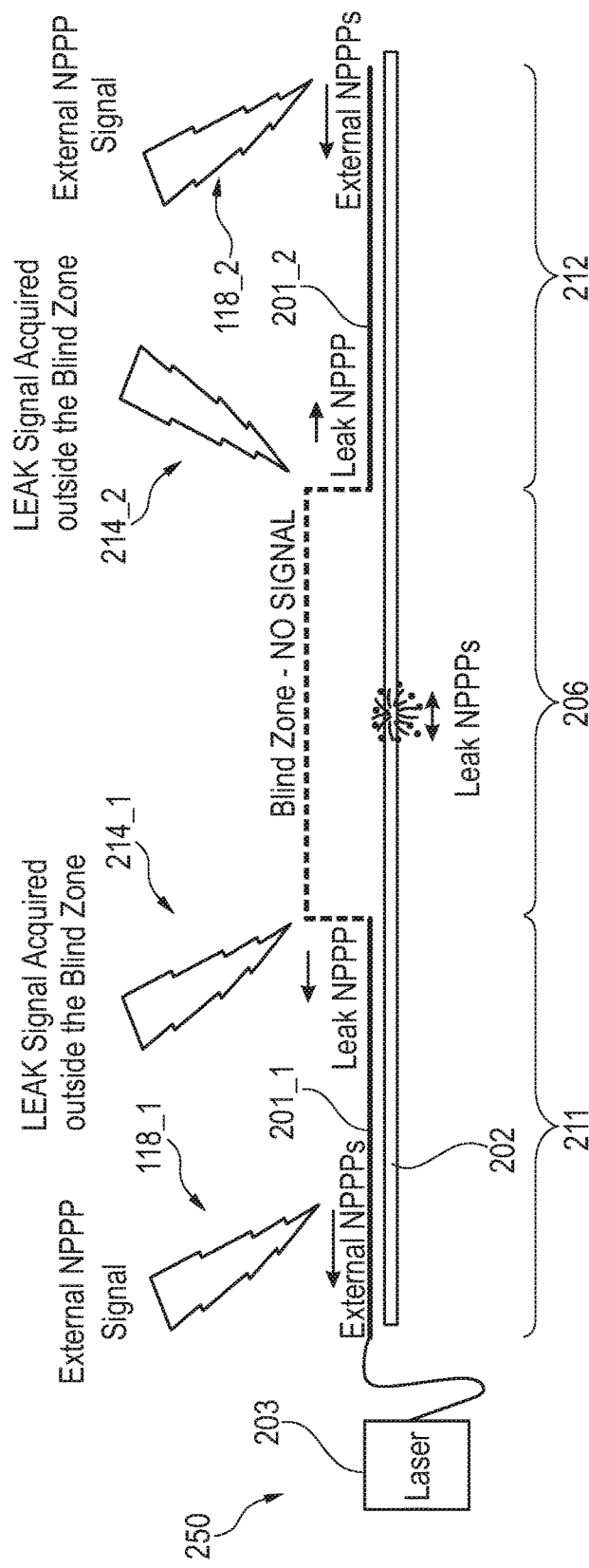

In FIG. 2, the blind zone 206 represents a zone where no signal can be detected by any optical fibre due to one or more reasons.

Figure 3:
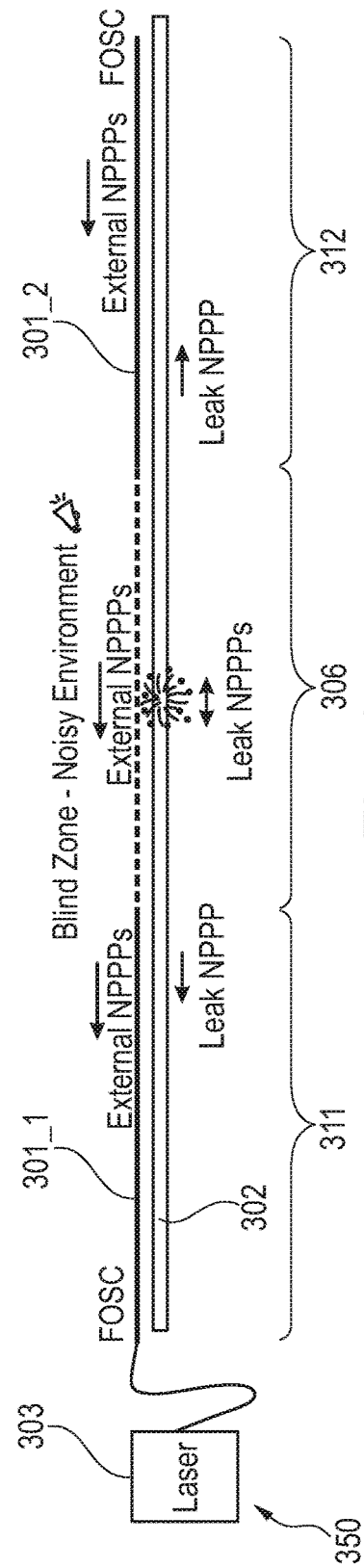

In the embodiment illustrated in FIG. 3, the blind zone 306 represents a region of excessively high noise, prohibiting reliable backscatter light detection, in spite of the presence of an optical fibre 301 close to the object 302.

In the FIG. 4, the optical fibre 401 is too far away from the object 402 in the blind zone 416 such that no disturbance originating from any position at the object 402 within the blind region 416 is detectable by backscatter light travelling within the fibre 401.

In the embodiments illustrated in FIGS. 1, 2, 3, 4, a single optical fibre is provided at which a single interrogator 103, 203, 303, 403 is coupled. These single fibres are not broken or interrupted.

In contrast, the embodiments illustrated in FIGS. 5 and 6 show at least a first fibre 501_1 and a (separate) second fibre 501_2 which are not connected to each other but represent separate individual fibres. Each of those fibres 501_1, 501_2 is coupled to a respective interrogator 503_1, 503_2, respectively. Each of these interrogators 503_1, 503_2 comprises a light source, such as a laser source, a light modulator and a light detector. Furthermore, those interrogators may be synchronized, in order to adhere to a same timeframe.

In the embodiment of the arrangement 650 illustrated in FIG. 6, a first fibre 601_1 comprises a section extending along the object 602 and at least one loop section 618_1 wherein the fibre is wound around the object 602 for high resolution monitoring, for example. Also the second fibre 601_2 may or may not comprise such a loop section 618_2.

In the following, particular embodiments and/or particular details are disclosed which may be comprised in embodiments of a method or an arrangement according to embodiments of the present invention. However, the invention is not restricted to the below mentioned particular details:

Embodiments of the present invention may enable to extend FODS capability to detect and locate pipe leaks/ thefts or similar static acoustic events at "blind locations"

where the FOSC is not present. A FODS ASA and FOSC configuration may be used to determine if NPPPs detect outside the blind zones have originated inside the blind zones.

The FODS ASA may track the direction and timing of the NPPPs outside both sides of the blind zone to calculate and determine if new NPPPs have originated inside the blind zone are new NPPPs not just passing through a blind zone. These calculations may be necessary to take into account the NPPPs emanating from one side of the blind zone could be originated from the other side of the blind zone.

The FODS ASA may take into account that the new NPPPs originating inside a blind zone, will travel different distances to reach the FOSCs, being detected at different times as the leak/theft position will not necessarily be equidistant from the FOSC segments on each side of the blind zone. The lack of synchrony means that the length of the blind zone may be taken into consideration in order to calculate the location and location accuracy.

According to embodiments of the present invention the FODS ASA calculations may take into consideration the several different FOSC and Laser FODS interrogator configurations that are suitable for the FODS to monitor a blind zones, including but not limited to the following examples:
- The high environmental noise around the pipe monitored by a close FOSC is such that FODS sensing is not possible at that location. This can occur because the leak effect is smaller than the background noise signals or the environment noise is of such magnitude that it can saturate the FODS signal (see e.g. FIG. 3)
- Using one or multiple FODS Laser Interrogator(s) connected at one end of a continuous FOSC, positioned at close vicinity along the length of the pipe. A single or multiple Blind Zones are created when the FOSC separate from the pipe vicinity on crossings of rivers, lakes, fjords, motorways, bridges, offshore segments, landfall tunnels, returning to the close vicinity on the other side of the crossing (see e.g. FIG. 4)
- There is no FOSC at the blind segment or the FOSC was cut creating a blind segment. Using two or multiple FODS Laser Interrogators each monitoring separated pipe segments using FOSCs at close vicinity along the length of the monitored segment (see e.g. FIG. 5)
- The leak/theft location is beyond the length range capability of the laser interrogator used in conjunction with the FOSC (see e.g. FIG. 5)
- There is no FOSC close to the pipe, rendering most of the pipe as a blind segment. Localised extensions from a FOC away from the pipe can be constructed to create localised FOSCs patches. Using one or multiple FODS Laser Interrogators each monitoring a pair of localised FOSC patches installed in different locations (see e.g. FIG. 6). These localised FOSC patches can be simple FOSC cables or dedicated constructions where the Fibre Optic is embedded in other materials like fabrics, coatings on the pipe wall itself (composite pipes).
- Combinations of the above where FOSC patches are used in conjunction with FOSC installed near the pipe (see e.g. FIGS. 5 and 6 in combination)

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A method of fibre optic distributed sensing for detection of
an event at an event location within a blind region, the method comprising:
using at least one optical fibre arranged at least partly along an object to be monitored and at least one light pattern interrogator coupled with the optical fibre;
injecting light patterns at subsequent times;
detecting backscatter light from the light patterns;
analysing the backscatter light to determine the event location including:
identifying backscatter light from fibre disturbances due to a propagating pressure wave originating from the event location as event related backscatter light; and
analysing the event related backscatter light to determine the event location,
wherein the propagating pressure wave propagates through at least one of the object and surrounding between the object and the optical fibre; and
tracking a wave front originating from the event location at different locations at different times by considering the event related backscatter light,
wherein the blind region is formed by a region excluding a sensing accessible region.

2. The method according to claim 1, wherein considering the event related backscatter light involves at least one of:
extrapolating a curve of event related backscatter light into the blind region; and
regression analysis of a curve of event related backscatter light.

3. The method according to claim 1, wherein identifying the event related backscatter light takes into account at least one of:
a predefined speed of the propagating pressure wave, the predefined speed essentially being the speed of sound for sound propagating within at least one of the object and the surrounding between the object and the fibre;
a characteristic of the pressure wave evolution;
at least one intensity threshold.

4. The method according to claim 1,
wherein the at least one optical fibre extends as a first fibre section from the blind region in a first direction and extends as a second fibre section from the blind region in a second direction,
wherein detecting the backscatter light from the light patterns comprises:
detecting first backscatter light of the light patterns backscattered from the first fibre section;
detecting second backscatter light of the light patterns backscattered from the second fibre section,
wherein analysing the backscatter light comprises:
analysing the first backscatter light and the second backscatter light to determine the event location.

5. The method according to claim 4, further comprising at least one of:
tracking at least one of direction and timing of pressure wave related backscatter emanating from the first fibre section and the second fibre section;
identifying mirror symmetry related first backscatter light and second backscatter light originating from disturbances at a first location and a second location at the same time having a mirror plane at the event location;
calculating the event location according to:
xe=x1+(x2−x1)/2, wherein xe is the event location, x1 is the first location, x2 is the second location.

6. The method according to claim 4, wherein analysing the first backscatter light and the second backscatter light comprises:
- identifying first backscatter light from fibre disturbances due to a first propagating pressure wave portion originating from the event as first event related backscatter light;
- identifying second backscatter light from fibre disturbances due to a second propagating pressure wave portion originating from the event as second event related backscatter light;
- analysing the first event related backscatter light and the second event related backscatter light to determine the event location.

7. The method according to claim 1, further comprising at least one of:
- filtering the detected backscatter light for attenuating other event related backscatter light related to another event causing another propagating pressure wave having a speed different from the predefined speed;
- filtering the detected backscatter light for attenuating backscatter light that is due to a blind region outside event.

8. The method according to claim 7, further comprising at least one of:
- Fourier-transformation;
- masking and Fourier-back transformation; and
- detecting backscatter light from the first fibre section due to another pressure wave propagating towards the blind region and later detecting backscatter light from the second fibre section due to the other pressure wave propagating away from the blind region.

9. The method according to claim 1, wherein analysing the backscatter light to determine the event location takes into account at least one of:
- a length of the blind region; and
- environmental noise.

10. The method according to claim 1, wherein one of the following holds:
- a single fibre is arranged along the object and one interrogator is coupled to the fibre; and
- at least a first fibre is arranged extending from the blind region in a first direction and at least a second fibre is arranged extending from the blind region in a second direction, different from the first direction.

11. The method according to claim 1, wherein the blind region is formed by at least one of:
- an intact fibre but too high background noise;
- the fibre being too far away from the object;
- the fibre being more than 2 m away from the object;
- the fibre being more than 5 m away from the object;
- the fibre being more than 10 m away from the object;
- the fibre being broken;
- no fibre being present.

12. The method according to claim 1, wherein the object comprises at least one of:
- a pipe for at least one of liquid and gas;
- a pipe for at least one of hydrocarbon and water;
- an electric cable.

13. The method according to claim 1, wherein at least one of the following holds:
- the object is buried in the soil of the earth's surface;
- the object is buried in the soil at subsea; and
- the backscatter light is Rayleigh backscatter light, the method performing distributed acoustic sensing.

14. The method according to claim 1, wherein the event comprises at least one of an acoustic disturbance and a temperature change at the object at the event location.

15. The method according to claim 1, wherein the event is caused by at least one of:
- at least one acoustic pattern;
- at least one pressure pattern;
- an object damage;
- an object impact;
- an object breakage;
- an object theft action;
- an object deterioration;
- a pipe leak;
- a cable short circuit, wherein the event causes at least one of a fibre acoustic disturbance and a fibre temperature change and a fibre strain change and a fibre refractive index change.

16. An arrangement for fibre optic distributed sensing for detection of an event at an event location within a blind region, the arrangement comprising:
- at least one optical fibre arranged at least partly along an object to be monitored;
- at least one light pattern interrogator coupled with the optical fibre and adapted to inject light patterns at subsequent times;
- a detector adapted to detect backscatter light from the light patterns; and
- a processor adapted to analyse the backscatter light to determine the event location,
- wherein analysing the backscatter light to determine the event location includes:
  - identifying backscatter light from fibre disturbances due to a propagating pressure wave originating from the event location as event related backscatter light;
  - analysing the event related backscatter light to determine the event location,
- wherein the propagated pressure wave propagates through at least one of the object and surrounding between the object and the optical fibre;
- the processor being further adapted to track a wave front originating from the event location at different locations at different times by considering the event related backscatter light,
- wherein the blind region is formed by a region excluding a sensing accessible region.

17. The arrangement according to claim 16, configured as distributed acoustic sensing system.

* * * * *